United States Patent
Park et al.

(10) Patent No.: US 9,332,105 B2
(45) Date of Patent: May 3, 2016

(54) COMMUNICATION CONNECTING APPARATUS AND METHOD

(75) Inventors: Jihwan Park, Changwon-Si (KR); Jungwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/252,830

(22) Filed: Oct. 4, 2011

(65) Prior Publication Data

US 2012/0244876 A1 Sep. 27, 2012

(51) Int. Cl.
| | |
|---|---|
| H04M 1/60 | (2006.01) |
| H04M 1/23 | (2006.01) |
| G06F 3/0489 | (2013.01) |
| G06F 3/023 | (2006.01) |
| G06F 3/0488 | (2013.01) |
| G01C 21/36 | (2006.01) |
| H04M 1/725 | (2006.01) |

(52) U.S. Cl.
CPC ......... *H04M 1/6091* (2013.01); *G01C 21/3688* (2013.01); *G06F 3/023* (2013.01); *G06F 3/0489* (2013.01); *G06F 3/04886* (2013.01); *H04M 1/7253* (2013.01); *H04M 1/236* (2013.01)

(58) Field of Classification Search
CPC ....... G06F 1/1616; G06F 3/01; G06F 3/0238; G06F 3/04886; G06F 3/023; G06F 3/0489; H04N 5/44591; H04M 1/6091; H04M 1/7253; H04M 1/236; G01C 21/3688
USPC .......... 709/227, 228; 715/700, 701, 702, 716; 345/173, 1.1, 204; 455/414.1, 566, 455/569.1, 569.2
See application file for complete search history.

(56) References Cited

U.S. PATENT DOCUMENTS

| | | | |
|---|---|---|---|
| 7,199,787 B2 | 4/2007 | Lee et al. | |
| 2002/0085043 A1* | 7/2002 | Ribak | 345/810 |
| 2009/0095804 A1* | 4/2009 | Agevik et al. | 235/375 |
| 2009/0280863 A1 | 11/2009 | Shin et al. | |
| 2010/0127996 A1* | 5/2010 | Kitahara et al. | 345/173 |

(Continued)

FOREIGN PATENT DOCUMENTS

| | | |
|---|---|---|
| JP | 2010-130369 A | 6/2010 |
| KR | 10-2003-0012815 A | 2/2003 |

(Continued)

OTHER PUBLICATIONS

Dennis Yeo, Optimus Maximus Keyboard At CES 2008, Jan. 11, 2008, www.internetsiao.com.*
Art Lebedev Studio, Optimus Maximus Keyboard, Mar. 15, 2007, www.artlebedev.com.*

*Primary Examiner* — George Eng
*Assistant Examiner* — Hung Du
(74) *Attorney, Agent, or Firm* — Birch, Stewart, Kolasch & Birch, LLP

(57) ABSTRACT

A communication connecting apparatus, a mobile terminal, and a method of communicating among the apparatus and the terminal are discussed. According to an embodiment, the apparatus includes a communication unit configured to receive key information relating to at least one key disposed on the mobile terminal, when the communication connecting apparatus is coupled with the mobile terminal; a display unit; and a controller configured to generate at least one key image corresponding to the at least one key based upon the received key information, and to display, on the display unit, at least one soft key having the generated at least one key image thereon.

7 Claims, 10 Drawing Sheets

(56) References Cited

U.S. PATENT DOCUMENTS

| | | | |
|---|---|---|---|
| 2011/0172012 A1* | 7/2011 | Layne et al. | 463/37 |
| 2012/0071140 A1* | 3/2012 | Oesterling et al. | 455/414.1 |
| 2012/0081854 A1* | 4/2012 | Sirpal et al. | 361/679.22 |
| 2012/0198080 A1* | 8/2012 | Yang et al. | 709/227 |

FOREIGN PATENT DOCUMENTS

| | | |
|---|---|---|
| KR | 10-2003-0093879 A | 12/2003 |
| KR | 10-2006-0044181 A | 5/2006 |
| KR | 10-2006-0046232 A | 5/2006 |

\* cited by examiner

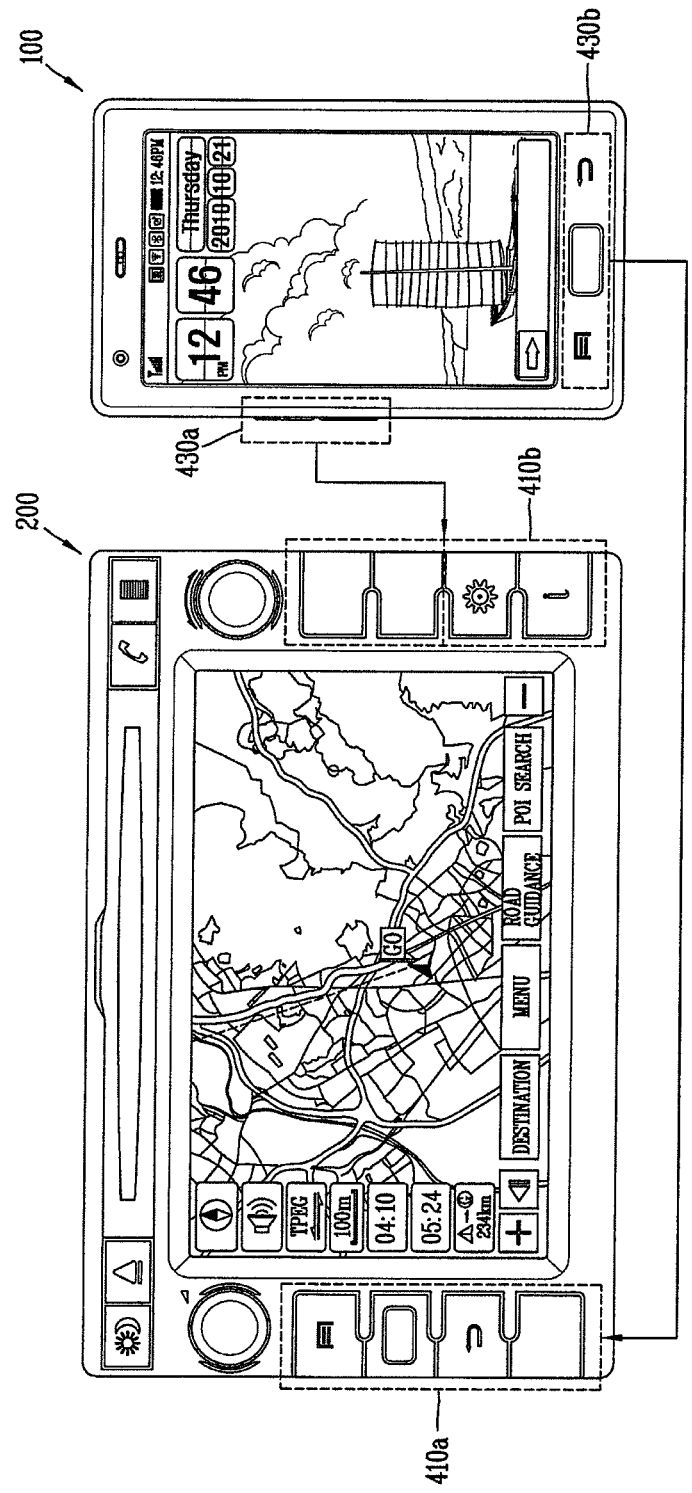

COMMUNICATION CONNECTING APPARATUS AND METHOD

CROSS-REFERENCE TO RELATED APPLICATION

Pursuant to 35 U.S.C. §119(e), this application claims the benefit of earlier filing date and right of priority to U.S. Provisional Application No. 61/467,746 filed on Mar. 25, 2011, the contents of which are incorporated by reference herein in its entirety.

BACKGROUND OF THE INVENTION

1. Field of the Invention

This invention relates to a communication connecting apparatus and method, and particularly, to a communication connecting apparatus which displays thereon keys that are disposed on mobile terminals, and an operation method of the communication connecting apparatus.

2. Background of the Invention

A communication connecting apparatus is an apparatus for displaying images and sounds via an internal/external input. The communication connecting apparatus may be built in a vehicle or connected to another external device (for example, mobile equipment such as a mobile or portable terminal) present within the vehicle via a wire or wirelessly. The communication connecting apparatus may receive images, sounds, other data or the like from the connected external device so as to output the same via a screen, a speaker or the like. In order to improve functions and control of the communication connecting apparatus when the communication connecting apparatus is connected to an external device, improvement of a structural and software implementation of the communication connecting apparatus is desired.

SUMMARY OF THE INVENTION

Therefore, an aspect of the present invention is to provide a user with intuitive interfaces by displaying, on a communication connecting apparatus, key images corresponding to hard and/or soft keys of mobile terminals when the communication connecting apparatus are connected to the mobile terminals.

Another aspect of the present invention is to allow fast and easy control in a communication connecting apparatus connected to mobile terminals by displaying different hard and/or soft keys of the mobile terminals on the keys or key images of the communication connecting apparatus by considering images and arrangements of the hard keys.

To achieve these and other advantages and in accordance with an embodiment of the present invention, a communication connecting apparatus may include a communication unit configured to receive hard key information relating to hard keys disposed on a mobile terminal, a controller configured to decide at least one key image corresponding to the hard keys based upon the hard key information, and a key input unit configured to display the decided key image, wherein the key input unit is located at least one side of an external body of the communication connecting apparatus, and includes a screen disposed at an upper portion thereof for displaying one or more key images.

In accordance with an embodiment of the present invention, the apparatus may further include a display unit configured to display the decided key image in form of a touchpad.

In accordance with an embodiment of the present invention, the apparatus may include a controller configured to detect at least one control key from an execution result of an application received from the mobile terminal and decide at least one key image corresponding to the detected control key.

To achieve these and other advantages and in accordance with an embodiment, an operation method for a communication connecting apparatus may include receiving hard key information relating to hard keys disposed on a mobile terminal, deciding at least one key image corresponding to the hard keys based upon the hard key information, and displaying the decided key image.

In accordance with an embodiment of the present invention, the method may further include receiving icon information relating to an application installed in the mobile terminal, deciding at least one icon image corresponding to the application based upon the icon information, and displaying the decided icon image.

In accordance with an embodiment of the present invention, the method may include detecting at least one control key from an execution result of an application received from the mobile terminal and deciding at least one key image corresponding to the detected control key.

In accordance with an embodiment of the present invention, there is provided a communication connecting apparatus for communicating with a mobile terminal including at least one key, the apparatus including: a communication unit configured to receive key information relating to the at least one key disposed on the mobile terminal, when the communication connecting apparatus is coupled with the mobile terminal; a display unit; and a controller configured to generate at least one key image corresponding to the at least one key based upon the received key information, and to display, on the display unit, at least one soft key having the generated at least one key image thereon.

In accordance with an embodiment of the present invention, there is provided a mobile terminal for communicating with a communication connecting apparatus, the mobile terminal including a position locating unit configured to provide location information associated with the mobile terminal; at least one key configured to receive a user input; a communication unit configured to transmit key information relating to the at least one key to the mobile terminal, when the mobile terminal is coupled to the communication connecting apparatus; and a controller configured to control the position locating unit and the communication unit, to receive a request signal corresponding to an operation of the at least one key from the communication connecting apparatus, and to generate at least one control signal for performing the operation of the at least one key at least one of the mobile terminal and the communication connecting apparatus.

In accordance with an embodiment of the present invention, there is provided a communication method including: when a communication connecting apparatus and a mobile terminal are connected to each other, receiving key information relating to at least one key disposed on the mobile terminal by the communication connecting apparatus from the mobile terminal; generating, by the communication connecting apparatus, at least one key image corresponding to the at least one key based upon the received key information; displaying, on a display unit of the communication connecting apparatus, at least one soft key having the generated at least one key image thereon; and when a selection of a soft key from the displayed at least one soft key is received, performing a function corresponding to the selected soft key at least one of the communication connecting apparatus and the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4A and 4B are exemplary views illustrating that hard keys disposed on a mobile terminal are displayed on the communication connecting apparatus according to an embodiment of the present invention;

DETAILED DESCRIPTION OF THE PREFERRED EMBODIMENTS

Hereinafter, exemplary embodiments associated with the present disclosure will be described in more detail with reference to the accompanying drawings. Suffixes "module" and "unit" used for constituent elements disclosed in the following description are merely intended for easy description of the specification without giving any special meaning or function. The suffixes "module" and "unit" may be used together.

In addition, the exemplary embodiments associated with the present disclosure are described in detail with reference to the accompanying drawings and contents disclosed in the accompanying drawings, but this specification may not be restricted or limited by those exemplary embodiments.

Terms used in this specification are selected from commonly used terms as much as possible with considering functions of the exemplary embodiments, so those terms may change according to an intension of a skilled person in this art, a convention, an appearance of a new technology and the like. Also, for a specific case, there may be a term which is randomly designated by the applicant, and in this case, the meaning of the term will be described in the corresponding description part of this specification. Therefore, it should be noticed that the terms used in this specification will be construed based on the meaning that the corresponding terms actually have and the overall description of this specification.

Figure 1:
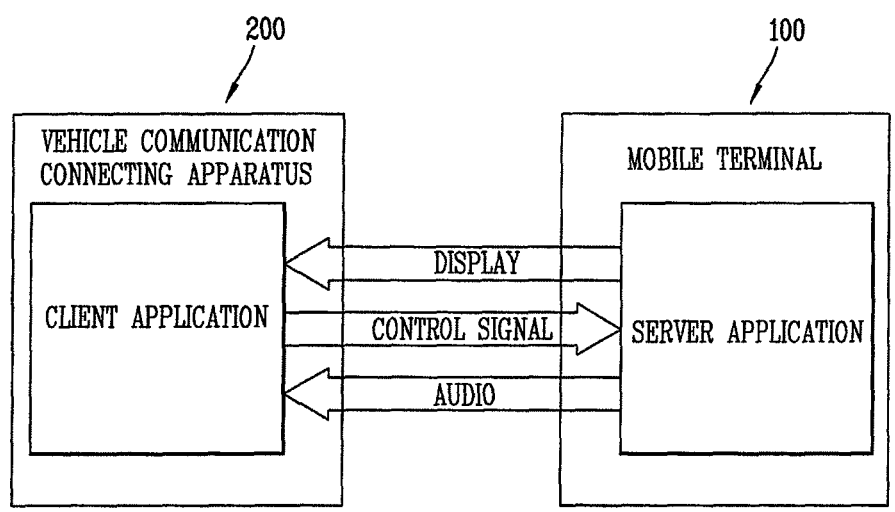
FIG. 1 conceptually illustrates a communication connecting apparatus connected to a mobile terminal to be able to communicate with the mobile terminal according to an embodiment of the present invention.

FIG. 1 conceptually illustrates a mobile terminal and a communication connecting apparatus connected to the mobile terminal according to an embodiment of the present invention. As illustrated in FIG. 1, a mobile terminal 100 and a communication connecting apparatus 200 are connected to each other. All the components of the mobile terminal 100 and the communication connecting apparatus 200 are operatively coupled.

The mobile terminal 100 may be connected to the communication connecting apparatus 200 via a wire and/or wirelessly. The mobile terminal 100 transmits to the communication connecting apparatus 200 at least one of a screen image and voice/audio as an execution result of an application, which is executed in the mobile terminal 100, via an interface. Here, the mobile terminal 100 is preferably located within a vehicle (e.g., carried by a user) but is clearly not limited to such location or device. As variations, the mobile terminal 100 may be located outside the vehicle within a range of being wirelessly connectable to the communication connecting apparatus 200.

The communication connecting apparatus 200, which is connected to at least one mobile terminal 100 via a wire or wirelessly, may receive at least one of the screen image and the voice from the connected mobile terminal 100 and output the received at least one of the screen image and the voice. The communication connecting apparatus 200 may be a TV, HBBTV, smart TV, IPTV or the like, and fixedly or detachably mounted to a vehicle if located within the vehicle. For instance, the communication connecting apparatus 200 may be a display or display device installed or built-into a vehicle (e.g., for displaying maps, programs, TV signals, etc.) and the mobile terminal 100 can be a smart phone, cell phone, etc. which is brought into or near the vehicle. When the mobile terminal 100 is nearby, the communication connecting apparatus 200 and the mobile terminal 100 can be configured so that they automatically communicate with each other. Contents that can be displayed on the mobile terminal 100 can then be instead or at the same time displayed on the communication connecting apparatus 200 for a better viewing, and audio data that can be output from the mobile terminal 100 can then be instead output by the communication connecting apparatus 200. In this regard, the mobile terminal 100 is using the output unit (e.g., display, speaker, etc.) of the communication connecting apparatus 200 to output its own contents.

The communication connecting apparatus 200 may receive a specific command from a user via an interface and transmit it to the connected mobile terminal 100. For example, when the user touches or presses a touchpad or a keypad displayed on a screen of the communication connecting apparatus 200 so as to input a specific command to the communication connecting apparatus 200, the communication connecting apparatus 200 senses a position of the input-applied point and transmits information related to the sensed position to the mobile terminal 100.

In that case, the mobile terminal 100 may determine that a touch event has been generated at the touch input-applied point, and thus perform an operation corresponding to the generated event. For instance, the user may control operations of the mobile terminal 100 using the touchpad, the keypad and the like provided on the communication connecting apparatus 200. As variations, the user may control the operations of the mobile terminal 100 as well as the operations of the communication connecting apparatus 200 at the same time by using the touchpad, keypad and other input unit provided on the communication connecting apparatus 200. Since the touchpad, keypad and other input unit provided on the communication connecting apparatus 200 will be generally larger than the input unit provided on the mobile terminal 100 and thus more easily maneuverable by the user, the present invention allows the user to use the input unit of the communication connecting apparatus 200 to control the operations of the mobile terminal 100. As one detailed example, when the communication connecting apparatus 200 of a vehicle and the mobile terminal 100 are connected to each other, the user enters input to the mobile terminal 100 and thereby executes a road guidance application (or dialing, phonebook, e-mail, video reproducing or the like) installed in the mobile terminal 100. Then the mobile terminal 100 is allowed to transmit an execution image of the road guidance application to the communication connecting apparatus 200 so as to display the execution image of the road guidance application from the mobile terminal 100 on the display of the communication connecting apparatus 200. For instance, the user may view the execution image of the road guidance application on a large screen of the communication connecting apparatus 200, instead of or in addition to a small screen of the mobile terminal 100. Also, the user may hear a road guidance voice via a speaker (part of the apparatus 200) mounted in the vehicle other than a speaker of the mobile terminal 100.

Also, when the user selects a menu relating to a road guidance using a touchpad or keypad provided on the communication connecting apparatus 200, then the communication connecting apparatus 200 generates and sends control signals corresponding to the input to the mobile terminal 100 so that the mobile terminal 100 is allowed to perform an operation of the corresponding selected menu. Namely, it is similar to the mobile terminal 100 being remotely controlled by the communication connecting apparatus 200. The mobile terminal 100 then transmits an execution result of the operation relating to the selected menu to the communication connecting apparatus 200 and the execution result is output on the communication connecting apparatus 200.

The communication connecting apparatus 200 can include one or more processors, applications, controllers for executing the operations discussed herein. The mobile terminal 100 and the communication connecting apparatus 200 may be connected to each other using a short-range communication standard such as Bluetooth or the like, an Internet standard such as Wi-Fi or the like, an external device interface standard such as Universal Serial Bus (USB) or the like, etc.

The mobile terminal 100 may include a server application installed therein to provide a service in response to a client request, and the communication connecting apparatus 200 may include a client application installed therein to allow access to a service provided from a server.

The server application of the mobile terminal 100 may capture a screen of the mobile terminal 100 regardless of a type of application of the mobile terminal 100, and transmits the captured screen to the client application of the communication connecting apparatus 200. Also, the server application controls operations of the mobile terminal, based upon information related to an event generated in the communication connecting apparatus 200, transmitted by the client application.

For example, the communication connecting apparatus 200 may remotely control the mobile terminal 100 by Virtual Network Computing (VNC), which uses a Remote Frame Buffer (RFB) protocol supporting a remote access with respect to a Graphical User Interface (GUI). The VNC is a method configured such that the mobile terminal 100 transfers a screen update to the communication connecting apparatus 200 and the communication connecting apparatus 200 transmits a generated input event to the mobile terminal 100, via a network.

The mobile terminal 100, for example, may transmit voice/audio to the communication connecting apparatus 200, a headset, a hands-free and the like, according to an Advanced Audio Distribution Profile (A2DP), which defines a voice quality of an audio (stereo or mono), which is to be streamed from a first device to a second device via a Bluetooth connection, especially, Headset Profile (HSP) related to Bluetooth headset, especially, Hands-Free Profile (HFP) applied to a hands-free kit for vehicle.

Meanwhile, the communication connecting apparatus 200 and the mobile terminal 100 may exchange additionally required information with each other based upon a separate protocol. For example, the communication connecting apparatus 200 may provide the mobile terminal 100 with vehicle status information, such as traveling information, speed information, fuel information and the like.

The mobile terminal 100 may transmit useful information to the communication connecting apparatus 100 based upon such information provided by the communication connecting apparatus 200. Similar to this, the mobile terminal 100 may transmit the communication connecting apparatus 200 with product information related to the mobile terminal 100, for example, serial number, MAC address, product design, digital certificate and the like. The communication connecting apparatus 200 may perform a specific function or transmit useful information to the mobile terminal 100 in turn based upon such information.

Some applications installed in the mobile terminal 100 may use the vehicle status information received from the communication connecting apparatus 200 using separate protocols. Such applications may provide the communication connecting apparatus 200 with application related information, such as an application type (for example, a road guidance, multimedia, game, etc.), a GUI type (for example, map, video, menu, etc.), an application state (for example, being executed at a foreground or background, etc.) and the like.

By exchanging information, a communication between the mobile terminal 100 and the communication connecting apparatus 200 can be established automatically whenever these devices are near or within a predetermined distance from each other. For instance, when the user carrying the mobile terminal 100 enters a vehicle in which the apparatus 200 is installed, the mobile terminal 100 carried by the user and the apparatus 200 may automatically be connected for communication with each other.

Figure 2:
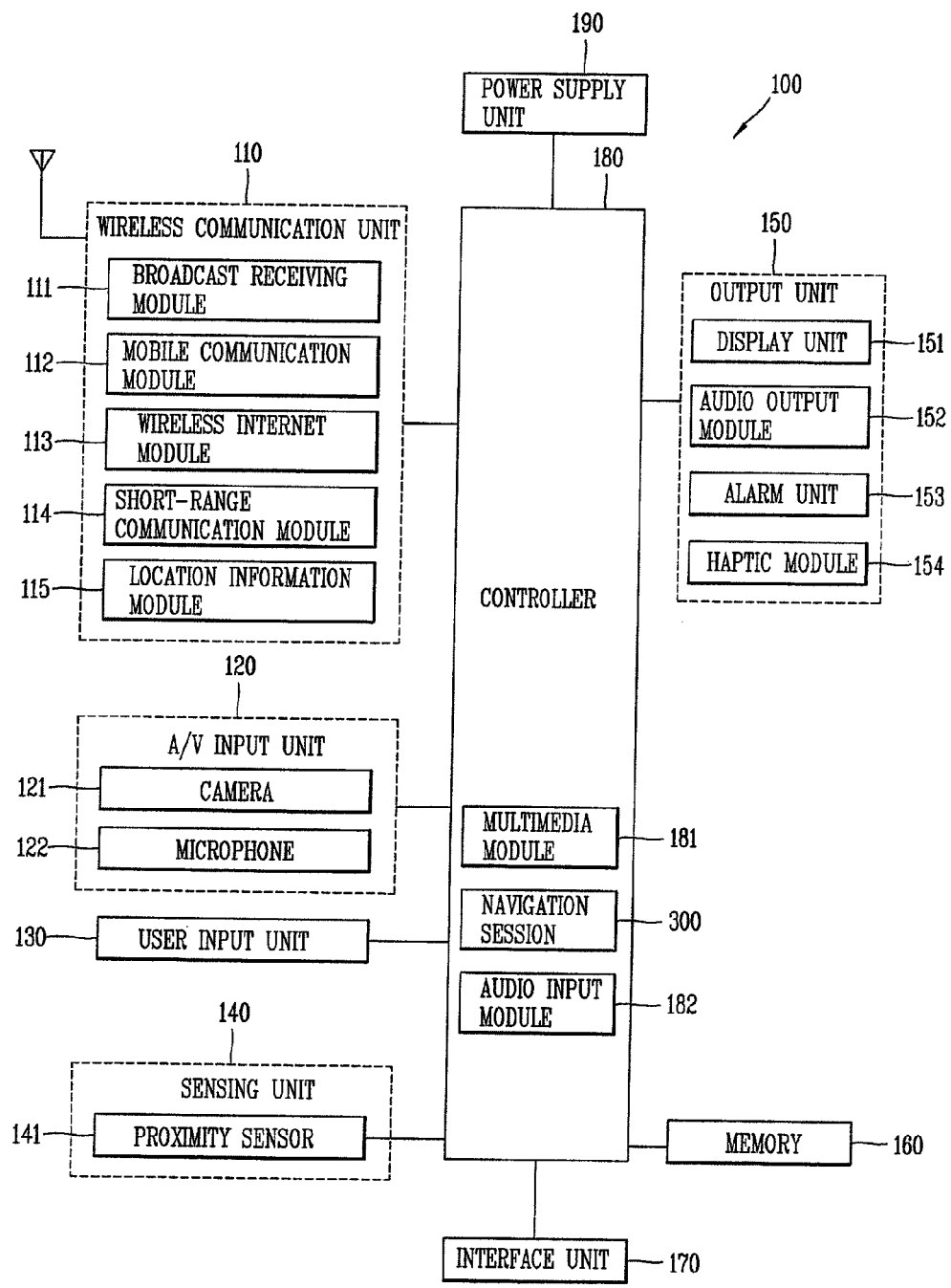
FIG. 2 is a block diagram illustrating in detail an example of the mobile terminal of FIG. 1.

FIG. 2 is a block diagram illustrating in detail an example of the mobile terminal of FIG. 1. The mobile terminal 100 may be implemented in various types. Examples of the mobile terminal 100 may include, but not limited to, a cellular phone, a smart phone, a laptop computer, a digital broadcasting terminal, a Personal Digital Assistants (PDA), a Portable Multimedia Player (PMP) and the like.

As illustrated in FIG. 2, the mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 2 may not be needed or present, and the mobile terminal 100 may be implemented with greater or less number of elements than those illustrated elements. The mobile terminal 100 may include other elements.

The wireless communication unit 110 can include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module (or wireless network mobile) 113, a short-range communication module 114, a location information module (or location tracking module) 115 and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (Media FLO), digital video broadcast-handheld (DVB-H), integrated services digital broadcast-terrestrial (ISDB-T), and the like. The broadcast receiving module 111 is configured to be suitable for every broadcast system that provides a broadcast signal as well as the above-mentioned digital broadcast systems. Broadcast signals and/or broadcast related information received via the broadcast receiving module 111 may be stored in the memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access or other network access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, the module 114 may use a short-range communication technology including Bluetooth, Radio Frequency IDentification (RFID), Infrared Data Association (IrDA), Ultra WideBand (UWB), ZigBee, and the like.

The location information module 115 is a module for checking and/or acquiring a location of the mobile terminal, such as a GPS module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites. Wi-Fi Positioning System and/or Hybrid Positioning System may be applied as the position location module 115.

The position information module 115 may further include a geomagnetic sensor and/or a gravity sensor for detecting an orientation. For example, the position information module 115 may detect an orientation (for example, east, west, south or north direction) of the mobile terminal by the geomagnetic sensor (digital magnetic compass) for implementing a navigation using augmented reality. The position information module 115 may detect to which direction a gravity is applied by using the gravity sensor (G sensor). When it is detected that a user holds the mobile terminal long in a vertical direction, a screen which is long in the vertical direction is output, and when holding the mobile terminal long in a horizontal direction, a screen automatically rotates by 90° to output a horizontally wide screen. Also, when the user watches a video (moving picture), the position information module 115 may rotate a screen in a direction that the user holds the mobile terminal through the gravity sensor (G sensor) such that the user can watch the video in a comfortable state.

The A/V input unit 120 is configured to provide audio and/or video signal input to the mobile terminal. The A/V input unit 120 may include one or more cameras 121 and one or more microphones 122. The camera 121 receives and processes image frames of still pictures and/or video obtained by image sensors in a video call mode or a capturing mode. The processed image frames may be displayed on a display unit 151 of the output unit 150.

The image frames processed by the camera 121 may be stored in the memory 160 and/or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A layered structure of the touchpad and the display unit 151 may be referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. The sensing unit 140 may include a proximity sensor 141.

The output unit 150 is configured to output at least one of an audio signal, a video signal and an alarm signal. The output unit 150 may include the display unit 151, an audio output module 152, an alarm unit 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. Another example, if the mobile terminal is in a video call mode or a capturing mode, the display unit 151 may additionally or alternatively display images captured and/or received, UI, or GUI. Also, when the mobile terminal 100 is connected to an external device to be able to communicate therewith and receive image, text or displayable information, the display unit 151 may display the received, image, text or other information.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The display unit 151 may be implemented in two or more in number according to a configured aspect of the mobile terminal 100. For instance, the mobile terminal 100 may include both an external display unit and an internal display unit.

Here, if the display unit 151 and a touch sensitive sensor (referred to as a 'touch sensor') have a layered structure therebetween, the display unit 151 may be used as an input device as well as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, a corresponding signal(s) is(are) transmitted to a touch controller (not shown). The touch controller processes the received signal(s), and then transmits corresponding data to the controller 180. Accordingly, the controller 180 may sense which region of the display unit 151 has been touched.

A proximity-touch in this specification indicates that a pointer does not actually touch a screen but approaches the screen by being apart therefrom by a predetermined distance.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. The position corresponding to the proximity touch of the pointer on the touch screen indicates a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The sensing unit 140 may include an acceleration sensor. The acceleration sensor is a device for changing an acceleration change in one direction into an electrical signal, and is widely used with the development of a microelectromechanical systems (MEMS) technology. The acceleration sensor may include various types, starting from a sensor, which is mounted in an airbag of a vehicle for measuring a great acceleration value used for detecting a collision, to a sensor, which recognizes a delicate operation of a human hand(s) to measure a minute acceleration value used as an input element of games or the like. The acceleration sensor may be typically configured by mounting two or three axes in one package, and alternatively require only Z-axis depending on usage environments. Hence, if X-axial or Y-axial acceleration sensor should be used instead of Z-axial acceleration sensor in some reason, an acceleration sensor may be mounted by erecting the acceleration sensor on a primary board using a separate plate.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. When a call signal received or a message received, the alarm unit 153 may vibrate the mobile terminal using a vibration element for notifying the reception. Also, when a key signal input, the alarm unit 153 may vibrate the mobile terminal 100 using a vibration element for feedbacking the key signal input. A user can recognize the event generation by the vibration. Alternatively, the signal for notifying the event generation may be output via the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. The haptic module 154 may be provided at a position of being frequently contactable with the user within the vehicle, for example, provided in a steering wheel, a transmission gear lever, a seat and the like.

The memory 160 may store one or more programs for the processing and control of the controller 180 as well as any data and contents generated or received by the mobile terminal 100. Alternatively, the memory 160 may temporarily store input/output data (e.g., phonebook data, messages, still images, video and the like). Also, product information related to the mobile terminal 100 may be previously stored in the memory 160.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. The memory 160 may include a removable storage unit such as a memory stick, a USB, etc. Also, the mobile terminal 100 may operate a web storage which performs the storage function of the memory 160 on the Internet or other network.

The interface unit 170 may generally be implemented to interface the mobile terminal 100 with external devices. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port. The interface unit 170 may be configured to receive data or power from an external device to transmit it to each component inside the mobile terminal 100, or may be configured to transmit data inside the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 generally controls the overall operations of the mobile terminal 100. For example, the controller 180 performs the control and processing associated with telephony calls, data communications, video calls, and the like. The controller 180 may include a multimedia module 181 which provides multimedia playback, multimedia recording, multimedia recording-reservation, etc. The multimedia module 181 may be configured as part of the controller 180 or as a separate component.

The controller 180 can perform a pattern recognition processing so as to recognize writing or drawing input on the touch screen as text or image.

The power supply unit 190 provides power needed by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180. For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 may further include an audio input module for recognizing a voice spoken by a user and performing a corresponding function according to the recognized voice signal. The audio input module may be part of the controller 180 or the user input unit 130. The mobile terminal 100 may further include a navigation session for displaying a traveling path on map data.

Figure 3:
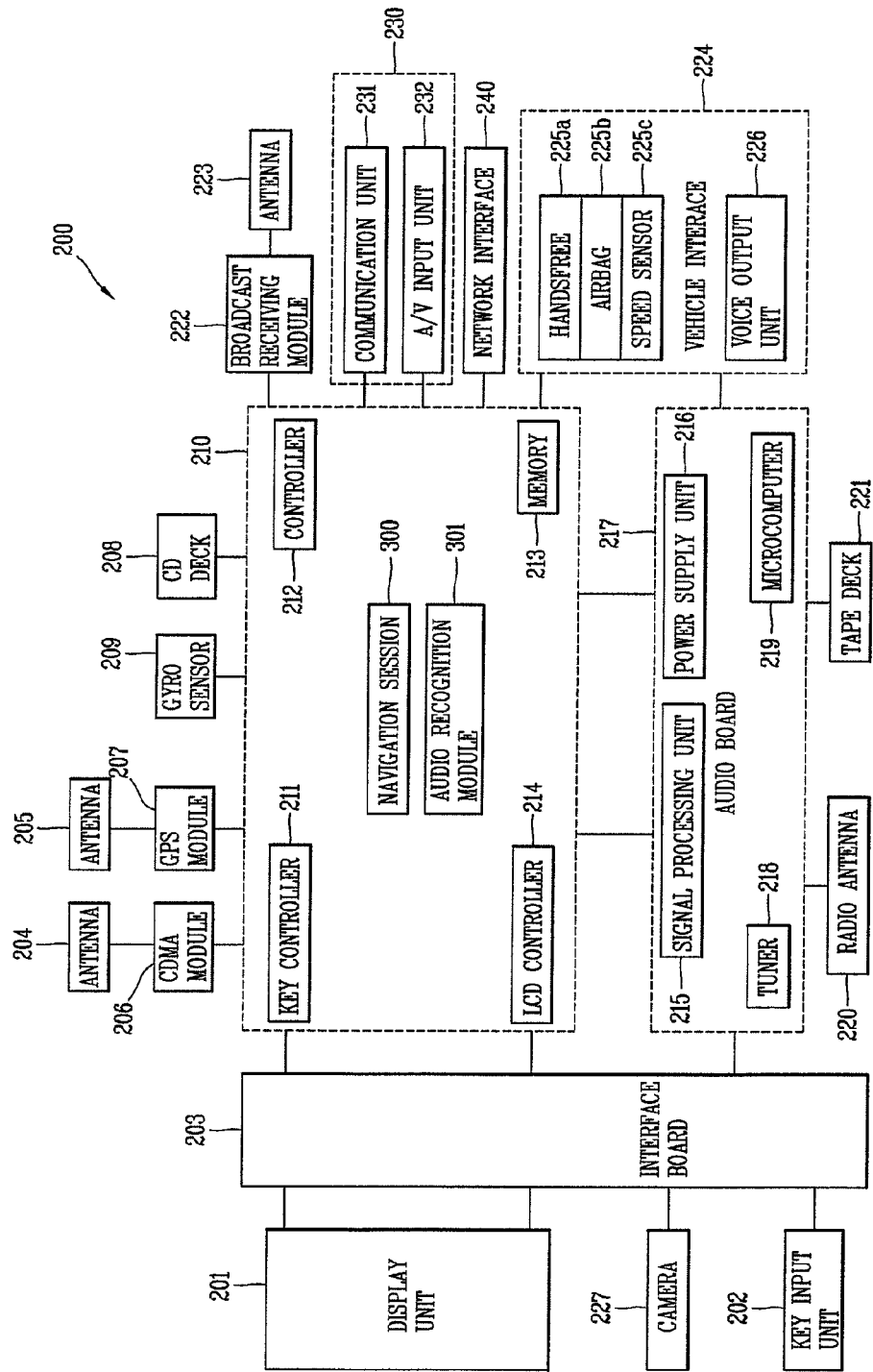
FIG. 3 is a block diagram illustrating in detail an example of a communication connecting apparatus according to an embodiment of the present invention.

FIG. 3 is a block diagram illustrating in detail an exemplary configuration of a communication connecting apparatus according to an embodiment of the present invention. The communication connecting apparatus is preferably located or built-into a vehicle, but does not need to be according to the present invention and can be a separate device at other locations. The vehicle in the present invention also include any means of transportation such as a train, a boat, an airplane, etc.

As illustrated in FIG. 3, the communication connecting apparatus 200 may include a main board 210. The main board 210 may include a controller (for example, Central Processing Unit (CPU)) 212 for executing overall controls of the communication connecting apparatus 200, a memory 213 for storing program(s) for processing and control of the controller 212 and input/output data, a key controller 211 for control of various key signals, and a Liquid Crystal Display (LCD) controller (or display controller) 214 for control of an LCD or other display. However, all of the elements as illustrated in FIG. 3 may not be needed or present and the communication connecting apparatus 200 may be implemented with greater or less number of elements than those illustrated elements.

The memory 213, for example, may store map information (map data) for displaying road guidance information on a digital map. Also, the memory 213 may store a traffic information collection and control algorithm for allowing a user to input traffic information according to a present condition of a road on which the vehicle is currently traveling, and information for controlling the algorithm. Also, the memory 213 may be configured to previously store or newly generate position, configuration, image information related to an external device (e.g., mobile terminal 100) connected to the communication connecting apparatus 200 by a wired or wireless communication as default image.

The main board 210 may include a Code Division Multiple Access (CDMA) module 206 built in a vehicle and provided with a uniquely given device number, a GPS module 207 for receiving a GPS signal to guide a position of a vehicle, track a traveling route from a depart point to an arrival point, etc., or for transmitting traffic information collected by a user as a GPS signal, a CD deck 208 for reproducing a signal recorded on a compact disk (CD), a gyro sensor 209 and the like. The CDMA module 206 and the GPS module 207 may exchange signals via antennas 204 and 205.

Also, a broadcast receiving module 222 may be connected to the main board 210 and receive a broadcasting signal via an antenna 223.

The main board 210 may also be connected with a display unit (LCD) 201 controlled by the LCD controller 214 via an interface board 203, a key input unit 202 controlled by the key controller 211 and/or LCD controller 214, and a camera 227 for capturing inside and/or outside of the vehicle.

The display unit 201 may display a variety of video signals and text signals. The display unit 201 may display all of image signals and text signals received when connected to an external device such as the mobile terminal 100. The display unit 201 may include the proximity sensor and the touch sensor (touch screen) illustrated in FIG. 2.

The key input unit 202 may have buttons or keys for input of various key signals, and transmit a key signal corresponding to a key selected by a user to the main board 210. The key input unit 202 may include a plurality of hard keys. Each of the hard keys may have a small screen or display area thereon, such as LCD so as to display various images on the screen in a switching manner. The screen may include, but not limited to, one of an LCD, OLED and TOLED each visually displaying images. Each of the hard keys may be configured to have each of small liquid crystal screens. Alternatively, the hard keys may be configured to have at least one large LCD, which may be partitioned into small screens by a plurality of lines so as to discriminate individual hard keys from one another. In addition, the key input unit 202 may serve as an interface in that when a user touches a specific key of the key input unit 202, and the controller 211 and the LCD controller 214 detect such user input and perform an operation or function corresponding to an image displayed on the touch-inputted key.

An audio board 217 may be connected to the main board 210, and process a variety of audio signals. The audio board 217 may include a microcomputer 219 for controlling the audio board 217, a tuner 218 for receiving a radio signal, a power supply unit 216 for supplying power to the microcomputer 219, and a signal processing unit 215 for processing a variety of voice signals.

Also, the audio board 217 may include a radio antenna 220 for reception of radio signals, and a tape deck 221 for reproducing an audio tape. The audio board 217 may further include an audio output unit (for example, amplifier) 226 for outputting signal-processed audio signals.

The amplifier 226 may be connected to a vehicle interface 224. For instance, the main board 210 and the audio board 217 are connected to the vehicle interface 224. A hands-free 225a for inputting an audio signal, an airbag 225b for a passenger's safety, a speed sensor 225c for sensing a vehicle speed, and the like may be also connected to the vehicle interface 224. The speed sensor 225c may calculate a vehicle speed and provide information related to the calculated vehicle speed to the controller 212.

A navigation session 300 applied to the communication connecting apparatus 200 may provide road guidance information based on map data and current position information of a vehicle.

The display unit 201 may sense a proximity touch within a display window via the proximity sensor. For example, when a pointer (for example, a finger or a stylus pen) gives a proximity touch, the display unit 201 detects the position of the proximity touch and outputs position information related to the detected position to the controller 212.

An audio recognition unit (or audio recognition module) 301 may recognize a voice spoken by a user and perform a corresponding function in response to the recognized voice signal.

The navigation session 300 applied to the communication connecting apparatus 200 may display a traveling route on map data. When the mobile terminal 100 is located within a preset distance from a dead zone included in the traveling route, the navigation session 300 may automatically establish a wireless network with a terminal (for example, a vehicle-mounted navigator) mounted in a neighboring vehicle and/or a mobile terminal belonging to an adjacent pedestrian via a wireless communication (for example, short-range wireless communication network). Accordingly, the navigation session 300 may receive position information related to the neighboring vehicle from the terminal mounted in the neighboring vehicle, and position information related to the adjacent pedestrian from the mobile terminal belonging to the adjacent pedestrian.

The main board 210 may be connected to an external device interface 230 and a network interface 240. The external device interface 230 may serve to connect an external device to the communication connecting apparatus 200. To this end, the external device interface 230 may include a communication unit 231 and an A/V input/output unit 232.

The external device interface 230 may be connected wirelessly or via a wire to an external device, such as a Digital Versatile Disk (DVD), a Blueray, a game player, a camera, a camcorder, a computer (laptop computer) and the like. The external device interface 230 may allow transferring of image (still image or moving image), audio or data signals input from the exterior via a connected external device to the controller 212 of the communication connecting apparatus 200. Also, image, audio or data signals processed by the controller 212 may be output to the connected external device which may be the mobile terminal 100. To this end, the external device interface 230 may include a communication unit 231 and an A/V input/output unit 232.

The communication unit 231 may perform a short-range wireless communication with other electronic equipment such as the mobile terminal 100. The communication connecting apparatus 200 may establish a network with other electronic equipment according to communication standards, such as Bluetooth, Radio Frequency Identification (RFID), Infrared Data Association (IrDA), Ultra Wideband (UWB), Zigbee, Digital Living Network Alliance (DLNA) and the like.

The A/V input/output unit 232 may allow video and audio signals of the external device to be input in the communication connecting apparatus 200. Examples of the A/V input/output unit 232 may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal and the like.

Also, the external device interface 230 may be connected to various set-top boxes via at least one of the aforesaid terminals, thus to allow performing of input/output operations with the set-top boxes. The external device interface 230 may allow receiving of an application or a list of applications within a contiguous external device and transferring of the received application or the list of application to the controller 212 or the memory 213. The received information may be in a text form, or in an image form such as an icon image of an application or a captured image.

The network interface 240 may provide an interface for connection between the communication connecting apparatus 200 and a wired/wireless network including an Internet network. The network interface 240 may include, for example, an Ethernet terminal or the like for connection to a wired network, and use communication standards, such as Wireless LAN (WLAN) (Wi-Fi), Wireless Broadband (Wibro), World Interoperability for Microwave Access (Wimax), High Speed Downlink Packet Access (HSDPA) and the like, for connection to a wireless network.

The network interface 240 may allow data transmission and reception to/from other user or other electronic device via a connected network or another network linked to the connected network. For instance, the network interface 240 may allow transmitting of part of contents data stored in the communication connecting apparatus 200 to a user or electronic device selected from other users or electronic devices previously registered in the communication connecting apparatus 200.

The network interface 240 may allow access to a particular webpage via a connected network or another network linked to the connected network. For instance, the network interface 240 may allow access to a particular webpage via a network so as to enable data exchange with the corresponding server.

Besides, the network interface 240 may allow receiving of contents or data provided by a contents provider or a network operator. For example, the network interface 240 may allow receiving of contents, such as movie, advertisement, game, VOD, broadcasting signal or the like and related information, which are provided by the contents provider or the network operator, via a network. Also, the network interface 240 may allow receiving of update information related to a firmware and an update file provided by the network operator. In addition, the network interface 240 may allow data transmission to the contents provider or network operator. The network interface 240 may also allow selection and reception of a desired application of publicly open applications via a network.

All the components of the communication connecting apparatus 200 are operatively coupled. Further, as mentioned above, the communication connecting apparatus 200 may include just some of the components shown in FIG. 3 and the other components may be considered part of the vehicle or a system in which the apparatus 200 is located.

Figure 4B:
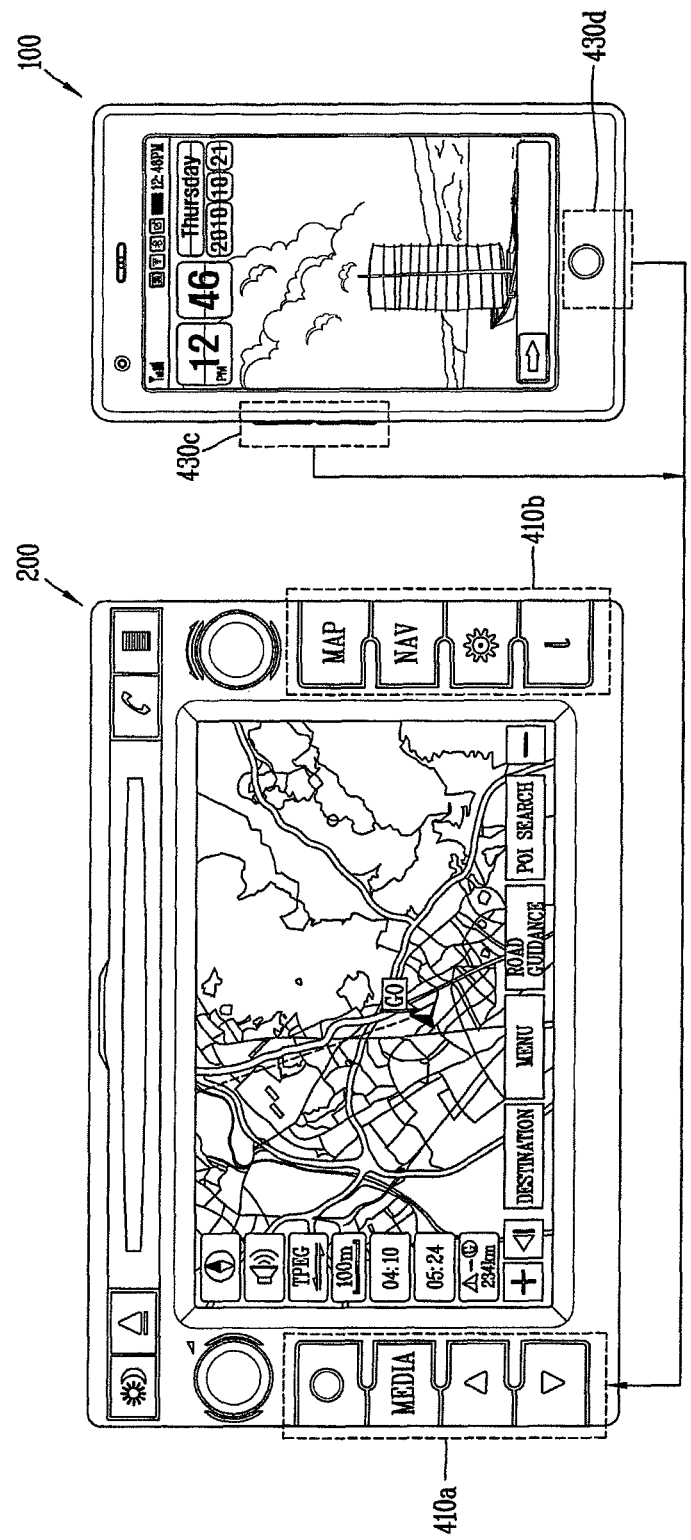

Now, some examples of the invention will be discussed below. All the examples discussed below can be preferably implemented in the mobile terminal 100 and the communication connecting apparatus 200 of FIGS. 1-3, but can be implemented in other suitable devices FIGS. 4A and 4B are exemplary views illustrating that key images of hard keys disposed on a mobile terminal are decided and displayed on a communication connecting apparatus according to an embodiment of the present invention. More particularly, FIGS. 4A and 4B illustrate that key images of hard keys 430a-430d disposed on the mobile terminal 100 are displayed respectively on soft or hard keys 410a and 410b of the communication connecting apparatus 200 connected to the mobile terminal 100.

Herein, the key image of the key is preferably decided as the same image as an image carved (or printed) on the hard key disposed on the mobile terminal 100. However, it may not be limited to that image. An image, which is newly made by changing the image into a text form, may be decided as the key image. For example, it is assumed that an image printed on a hard key disposed on the mobile terminal 100 is "▲" or "▼" Here, such image "▲" or "▼" may be used as it is as a key image, or an image in a text form, such as "Up" or "Down" may be used as a key image and may be disposed on or as the keys of the communication connecting apparatus 200.

The communication connecting apparatus 200 may be connected to the mobile terminal 100 via the external device interface 230 (see FIG. 3) to be allowed for a wired/wireless communication with the mobile terminal 100. The connected mobile terminal 100 may transmit key information relating to the hard keys 430a-430d that it has to the communication connecting apparatus 200 via the external device interface 230. Alternatively, the communication connecting apparatus 200 may request for key information relating to the hard keys 430a-430d disposed on the connected mobile terminal 100 by use of an appropriate command and receive a response to the request.

The key information may include images, positions, functions and the like relating to the hard keys 430a-430d of the mobile terminal 100. Here, the key image, as aforesaid, may be an image printed on the hard key of the mobile terminal 100. The key position may indicate an actual position of the hard key disposed on the mobile terminal 100. For example, the key position may include an approximate position indicating whether the hard key is positioned at a lower end, an upper end a side surface of an external body of the mobile terminal 100 and whether it is positioned on a right surface or a left surface if positioned on the side surface, or include relative positions of the hard keys, thereby allowing decision of positions on the communication connecting apparatus 200. The key function may indicate an operation/function performed when a corresponding hard key of the mobile terminal 100 is selected. For example, hard keys of the mobile terminal 100 may include several functions, such as a volume adjustment, a camera, a vibration mode switching, a call connection, a menu selection, a selection cancellation and the like, and other various functions, which are not limited according to the type of the mobile terminal 100.

Keys 410*a* and 410*b* of the communication connecting apparatus 200 may be provided at least one side of the body of the communication connecting apparatus 200, and each may have an LCD screen thereon. The communication connecting apparatus 200 may display key images corresponding to the respective hard keys 430*a*430*d* of the mobile terminal 100 on screens of the respective keys 410*a* and 410*b* based upon the received key information related to the connected mobile terminal 100. Here, the screen may be configured by a plurality of small LCD screens, as aforementioned, or by discriminately partitioning at least one large LCD screen into small screens as many as the number of keys disposed on the communication connecting apparatus 200. Also, the keys 410*a* and 410*b* of the communication connecting apparatus 200, as illustrated in FIGS. 4A and 4B, may be disposed on both right and left ends/sides of an external body of the communication connecting apparatus 200. As another example, those keys 410*a* and 410*b* may be disposed at another two ends of the external body other than the both right and left ends, three surfaces of both ends, a lower end and an upper end of the external body, or four surfaces of the external body. In addition, some of such keys may be configured as keys each having a screen thereon, and the others may be configured as typical hard keys each without a screen. Also, the upper screen of each key 410*a* and 410*b* may include, but not limited to, one of LCD, OLED and TOLED.

Each of mobile terminals connected to the communication connecting apparatus 200 may include hard keys having various key images, different key positions and different key functions. Referring to FIGS. 4A and 4B, the mobile terminal 100 of FIG. 4A may include hard keys 430*a* and 430*b*, and the mobile terminal 100 of FIG. 4B may include hard keys 430*c* and 430*d*.

The hard keys 430*a*, 430*b*, 430*c* and 430*d* may be different from one another in shape, position and function. The communication connecting apparatus 200 may receive key information (e.g., image, position, function, etc.) relating to the hard keys 430*a*, 430*b*, 430*c* and 430*d* to display on the keys 410*a* and 410*b* of the communication connecting apparatus 200. Here, since the key information received includes the position as well as the image, images corresponding to the hard keys 430*a*, 430*b*, 430*c* and 430*d* may be displayed on the keys 410*a* and 410*b* of the communication connecting apparatus 200 by considering actual positions or relative positions of the hard keys 430*a*, 430*b*, 430*c* and 430*d*.

In more detail, when the communication connecting apparatus 200 is connected with the mobile terminal 100, it obtains key information associated with one or more keys (e.g., hard keys or soft keys) of the mobile terminal 100. Then the communication connecting apparatus 200 displays on its display, key images corresponding to the keys of the mobile terminal 100 using the obtained key information. As a result, the user can now select the key images displayed on the apparatus 200 to carry out the functions associated with the key images/ keys. Since the key images would preferably be larger than the keys of the mobile terminal 100, it would be more convenient and easy for the user to operate the key images, e.g., while the user is driving. The functions here can be carried out at the apparatus 200 and/or mobile terminal 100 depending on the function.

For instance, according to one example of the present invention, FIG. 4A illustrates that the hard keys 430*b* located at the lower end of the mobile terminal 100 are also available at the left keys 410*a* of the communication connecting apparatus 200, and the hard keys 430*a* located at a left side of the mobile terminal 100 are also available at the right keys 410*b* of the communication connecting apparatus 200. A selection of the keys 410*a* and 410*b* (which now carry the functions of the keys 430*a* and 430*b* of the terminal 100) by the user then would cause a key function corresponding to the selection to be performed at the apparatus 200 and/or terminal 100.

In another example, FIG. 4B illustrates that the hard key 430*d* located at a center lower end of the mobile terminal 100 is available at the left keys 410*a* of the communication connecting apparatus 200, and the hard keys 430*c* located at the left side of the mobile terminal 100 are also available at the left keys 410*a* of the communication connecting apparatus 200. For example, if the connected mobile terminal 100 has a small number of hard keys or there are many hard keys assigned due to a plurality of mobile terminals 100 connected, such hard keys may be displayed on the same keys 410*a* of the communication connecting apparatus 200 regardless of the position information relating to the hard keys. Here, it may be decided to assign hard keys 430*c* and 430*d* of the mobile terminal 100 onto the left keys 410*a* of the communication connecting apparatus 200, starting from the hard keys 430*d* present at the center lower end of the mobile terminal or from the hard keys 430*c* present at the left side of the mobile terminal 100. The present disclosure may not be limited to the assignment order.

When giving a touch input on the key 410*a* or 410*b*, on which a key image is displayed, a key function corresponding to the key image present at the input-given position may be carried out. For example, in FIG. 4B, in a state that the hard keys 430*c* having "volume adjustment function" disposed on the mobile terminal 100 are available on the keys 410*a* of the communication connecting apparatus 200 and key images "▲" and "▼" are displayed on the upper screen of the keys 410*a* as shown, if a user applies a touch input onto the key 410*a* having the key image "▲" or "▼" displayed thereon, the corresponding "volume adjustment function" is carried out on the communication connecting apparatus 200. The actually volume adjustment may be carried out by the apparatus 200 or under the control of the mobile terminal 100 as the apparatus 200 communicates with the terminal 100.

According to an embodiment, the communication connecting apparatus 200 is fully capable of displaying the keys of different mobile terminals on the keys 410*a* and 410*b* of the apparatus 200. For instance, different mobile terminals (e.g., from the same user or different users) may be connected to the apparatus 200 at different times, and in such cases, the apparatus 200 would change the display and display the keys of only the currently connected mobile terminal. In another example, the apparatus 200 may be connected to multiple mobile terminals simultaneously.

Figure 5:
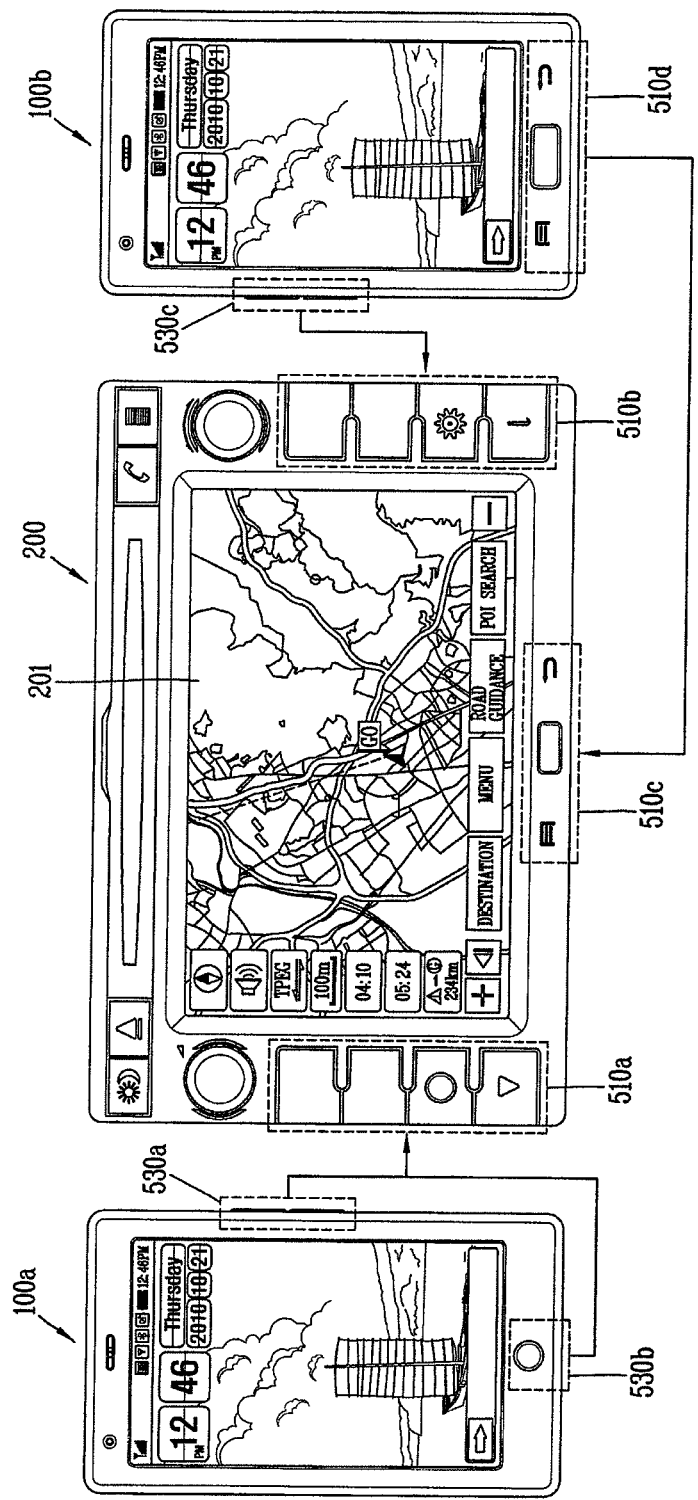
FIG. 5 is an exemplary view illustrating that hard keys disposed on each of a plurality of mobile terminals are distinguishably displayed on the communication connecting apparatus according to an embodiment of the present invention.

More specifically, in one embodiment, when a plurality of mobile terminals are connected to the communication connecting apparatus 200, such key images may be displayed to be distinguishable for each mobile terminal, which is illustrated in FIG. 5. For instance, as illustrated in FIG. 5, a plurality of mobile terminals 100*a* and 100*b* are connected to the communication connecting apparatus 200 at a same time.

Key images for hard keys 530*a*, 530*b*, 530*c* and 530*d* disposed on the respective mobile terminals 100*a* and 100*b* are then decided and displayed on keys 510*a*, 510*b* and 510*c* of the communication connecting apparatus 200. As one example, the hard keys 530*a* and 530*b* of the mobile terminal 100*a* may be assigned to the keys 510*a* of the communication connecting apparatus 200 as one set (or by being sequentially connected), and the hard keys 530*c* and 530*d* of the mobile terminal 100*b* may be assigned to the respective keys 510*b* and 510*c* of the communication connecting apparatus 200 as another set (or by being sequentially connected). As a result, a user can operate the keys 510*a*, 510*b*, 510*c* of the communication connecting apparatus 200 to control the operations of the mobile terminals 100*a* and 100*b*. Further, certain keys among the keys 510, 510*b*, 510*c*, depending on the key, may cause the user to control the operations of the communication connecting apparatus 200. The results of the operations that were performed can be displayed or output to the apparatus 200 for the user, as they are stored and processed in the respective mobile terminal.

Here, any allocation method, by which a plurality of hard keys disposed on each of a plurality of mobile terminals are distinguishable for each mobile terminal, may be applied with no limit. For example, those hard keys of the plurality of mobile terminals may be discriminately displayed in a manner of situating hard keys of the respective mobile terminals on keys present on different regions of the communication connecting apparatus 200 or displaying key images of the same mobile terminal with the same color. According to such manner, even when a plurality of mobile terminals are connected to the communication connecting apparatus, an intuitive interface, which facilitates the identification of hard keys disposed on each mobile terminal, can be provided.

Figure 6:
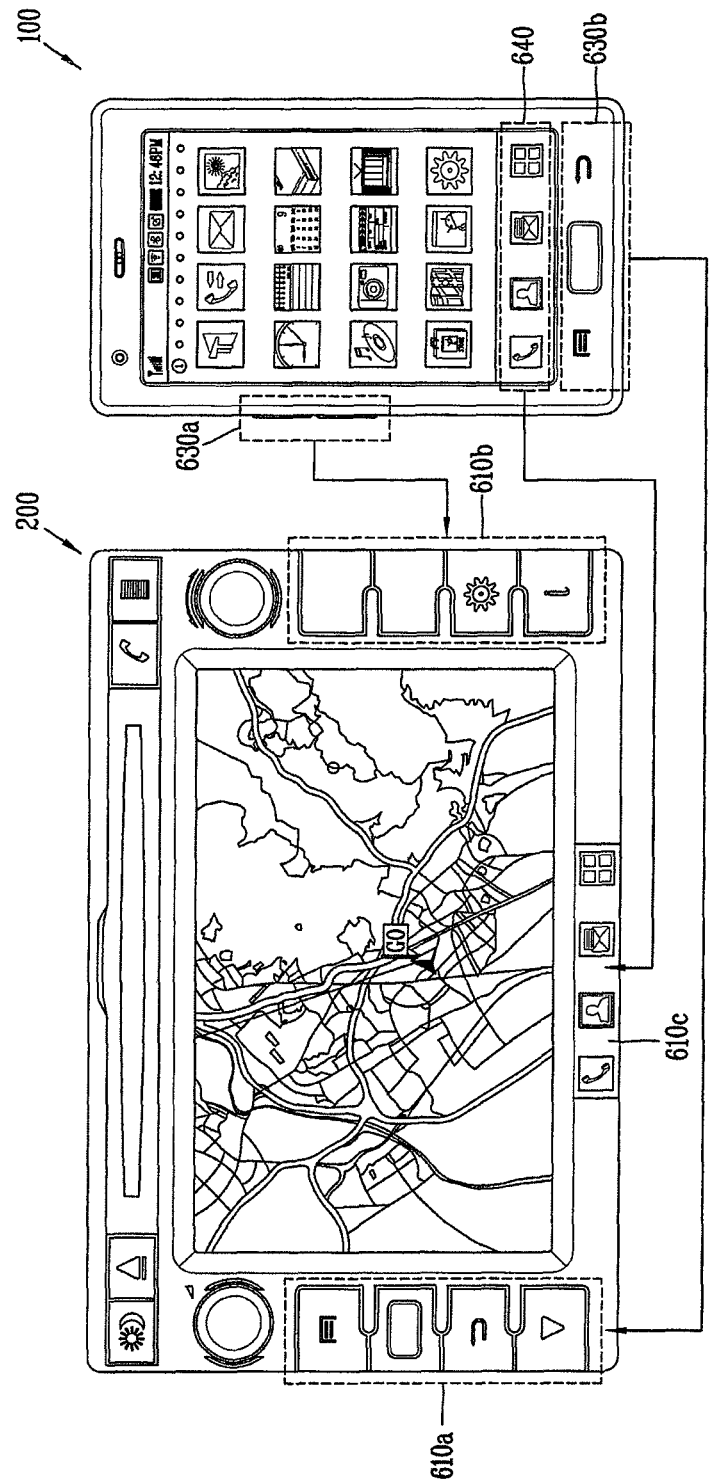
FIG. 6 is an exemplary view illustrating that icons of an application installed in the mobile terminal are displayed on the communication connecting apparatus according to an embodiment of the present invention.

In another example, the communication connecting apparatus may receive icon information related to applications installed in a mobile terminal connected to the communication connecting apparatus, which is illustrated in FIG. 6. In more detail, as illustrated in FIG. 6, hard keys 630*a* and 630*b* disposed on the connected mobile terminal 100 are assigned to keys 610*a* and 610*b* of the communication connecting apparatus 200, respectively. Icons 640 for applications installed in the mobile terminal 100 are also assigned to keys 610*c* of the communication connecting apparatus 200. Here, icon information related to the icons 640 may be provided via the external device interface (see FIG. 3). Alternatively, the icon images may be received from the mobile terminal in form of default images or received from an internal or external memory.

Images of the icons 640 of the applications to be assigned to the keys 610*c* of the communication connecting apparatus 200, may be decided by selecting some icons of the applications based upon the number of a user executing an application, the recently executed application, a predefined application, a user's selective input and the like, and then displayed on the keys (or key area) 610*c* of the communication connecting apparatus 200. As a variation, the icons 640 of all of applications may be selected and displayed on the communication connecting apparatus 200 when a small number of applications are installed.

In another example, when a specific key disposed on a mobile terminal is configured to execute different functions according to a key input method, e.g., a key has a plurality of functions, the corresponding plural functions may be also carried out in the communication connecting apparatus. For example, it is assumed that a first function is carried out when a user touches once a specific key disposed on a mobile terminal and a second function is carried out when the same key on the mobile terminal is shortly touched twice. Those first and second functions of the mobile terminal may be implemented to be equally triggered by a key of a communication connecting apparatus connected to the mobile terminal and to be performed in the mobile terminal and/or the communication connecting apparatus. To this end, the communication connecting apparatus 200 may receive key function information via the external device interface 230 shown in FIG. 3, transmit a request command for reception of such information, and acquire the information by fetching information previously stored in a memory. The acquired information may be transferred to the main board 210 of the communication connecting apparatus 200. Then, when an input is given to a specific key of the key input unit 202 (see FIG. 3) of the communication connecting apparatus 200, the input signal is also transferred to the controller 212 and the LCD controller 214 of the main board 210, thereby allowing a function corresponding to a key image displayed on the key of the communication connecting apparatus 200 to be carried out within the communication connecting apparatus 200.

In another example, when a specific hard key of a mobile terminal is configured to execute different functions according to a key input method, e.g., it carries out a plurality of functions, a corresponding key image of the key included in the key input unit 202 of the communication connecting apparatus 200 is displayed by being changed in response to the change of an executed function. For example, as a function of a key changes, a color of the corresponding key image changes and the color-changed key image is displayed on the communication connecting apparatus 200. However, the present disclosure may not be limited to this. A key image change may be applicable and also any method capable of recognizing the change of the executed function may be applicable.

Figure 7:
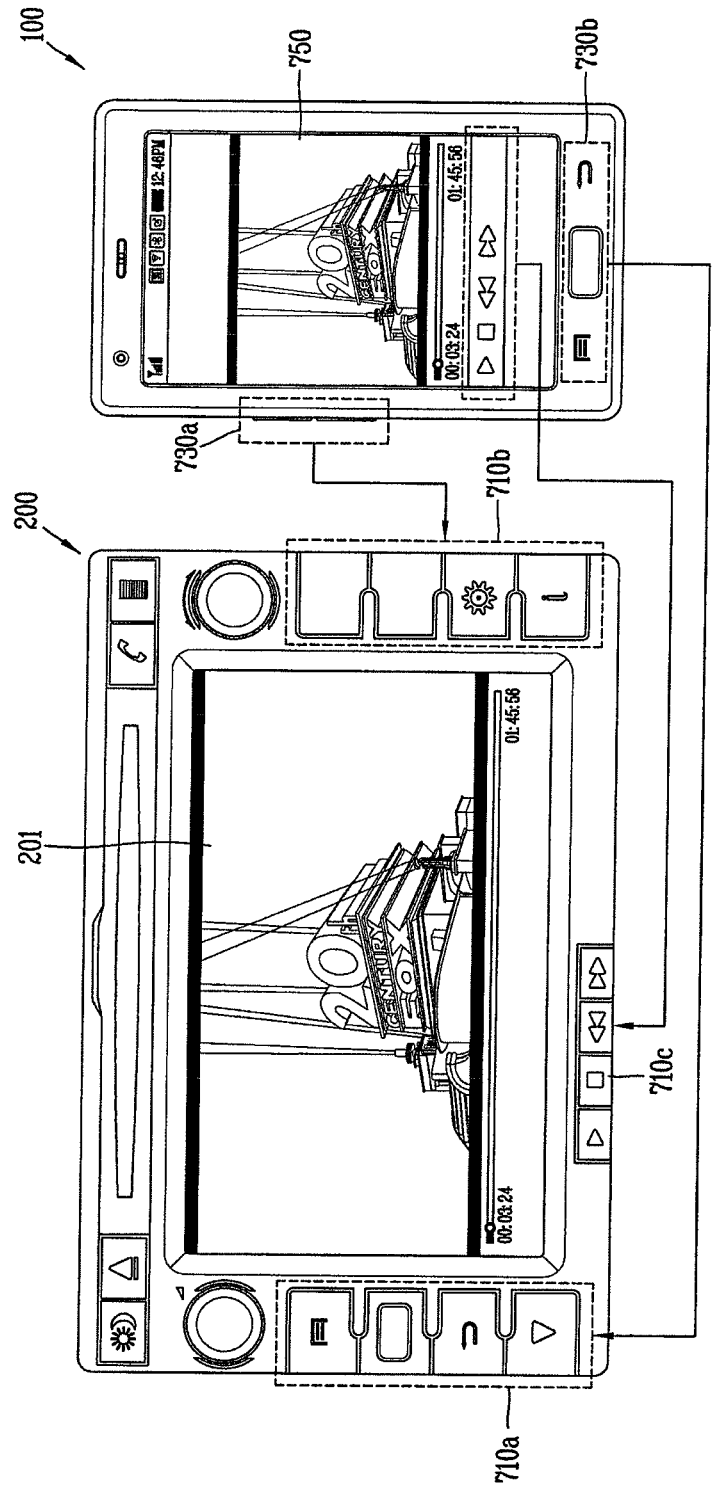
FIG. 7 is an exemplary view illustrating that control keys detected from an execution result of an application received from the mobile terminal are displayed on the communication connecting apparatus according to an embodiment of the present invention.

In another example, the communication connecting apparatus may detect at least one control key from an execution result of an application received from a mobile terminal connected to the communication connecting apparatus, decide at least one key image corresponding to the detected control key, and display the at least one key image on a key or area of the communication connecting apparatus, which is illustrated in FIG. 7 as an example. When a movie application is executed in the connected mobile terminal 100, for example, the communication connecting apparatus 200 may receive an execution result of the movie application via the external device interface 230, and output the received execution result on the display unit 201 of the apparatus 200. Hard keys 730*a* and 730*b* disposed on the connected mobile terminal 100 may be displayed on keys (or areas) 710*a* and 710*b* of the communication connecting apparatus 200, respectively, as described above in detail. For instance, as discussed above, the mobile terminal 100 may send key information (e.g., key image, key function, etc.) related to the keys 730*a*, 730*b* to the apparatus 200 and the apparatus 200 displays on its display, images (e.g., key images) 710*a*-710*c* corresponding to the keys 730*a*, 730*b* based on the received key information. The apparatus 200 is configured so that a selection of the key images 710*a*-710*c* has the same effect of selecting the key (730*a*, 703*b*) corresponding to the selected key image. Further depending on the key, the selection of the key image on the apparatus 200 may control operations of the apparatus 200.

Still referring to FIG. 7, the communication connecting apparatus 200 may detect at least one control key, which is implementable as a key, from the received execution screen of the application, decide a key image corresponding to the detected control key, and display the decided key image on the key 710*c* of the communication connecting apparatus

200. Explaining this configuration more concretely with reference to FIG. 7, control keys such as a play button, a stop button, a rewind button and forward button, may be detected, and key images corresponding to the selected control keys are decided to be displayed on the keys 710c of the communication connecting apparatus 200. The detected keys are mere examples and other variations are possible. Also, the key image, as mentioned above, may be decided by applying the same image as an image of the control key selected from the execution result of the application. However, the present disclosure may not be limited to this. An image, which is newly generated by changing the image into a text form, may be used as a key image.

A type of application for which a control key is detectable may not be limited to the above examples. For instance, all types of keys for controlling operations of an executed application may be targets to be detected. As one example, when executing a music application, a mute button, a volume adjustment button, a skip button, a search button and the like of the mobile terminal may be detected, and thereby displayed on keys of the communication connecting apparatus connected to the mobile terminal.

In an example of FIG. 7 according to the present invention, when the mobile terminal 100 is connected to the apparatus 200, a movie that is being displayed on a screen 750 of the mobile terminal 100 can be at the same time displayed on the display unit 201 of the apparatus 200. At the same time, the play control keys (e.g., pause, fast-forward, fast backward, stop, etc.) for controlling the playback of the movie from the mobile terminal can also be displayed on the keys 710c of the apparatus 200 so that the user can control the playback functions of the movie on the display unit 201 and the screen 750 using the keys 710c. At this time, as a variation, to conserver energy, the user can turn off the displaying of the movie on the screen 750 while the displaying of the movie on the display unit 201 continues. In the example of FIG. 7, the mobile terminal 100 sends video data of the movie from the mobile terminal 100 to the apparatus 200 so that the movie can be displayed on the apparatus 200. As a result, the user can enjoy the movie on the larger screen 750.

In another example, the communication connecting apparatus may be configured to delete a key image displayed thereon and return to its original state when an error is detected (e.g., including a case of receiving vehicle related information so as to detect an abnormal vehicle state when the communication connecting apparatus is mounted in the vehicle) or when the connected mobile terminal is disconnected. For instance, the key of the communication connecting apparatus may perform the original function. For example, when the communication connecting apparatus 200 is mounted in the vehicle, the communication connecting apparatus 200 may be configured to detect an emergency situation based on vehicle related information relating to a sudden change in the vehicle's driving speed, a precipitate stop and the like, and accordingly is converted to perform its original function. Alternatively, the communication connecting apparatus may be converted to carry out a typical function according to a user's selection/configuration or when the mobile terminal is disconnected from the communication connecting apparatus. In detail, an emergency situation within the vehicle is determined by the controller 212 based upon information provided from the vehicle (for example, detection of a vehicle speed, etc.), and whether a mobile terminal is in a connected state or not is detected by the communication unit 231 of the external device interface 230 (see FIG. 3). The detected information is then transferred to the controller 212.

Under this situation, a key image (corresponding to the key of the mobile terminal) implemented on the key of the communication connecting apparatus 200 is not displayed any more. Afterwards, an original image of the key of the communication connecting apparatus 200 may be displayed or any displaying may not be performed. For instance, when a vehicle emergency is detected, the apparatus 200 no longer displays the keys of the mobile terminal and instead may display default key images of the apparatus 200. Thusly, when key images displayed on the keys of the key input unit 202 of the communication connecting apparatus 200 are displayed after the communication connecting apparatus 200 is converted into a typical or original mode, the LCD controller 214 and the controller 212 may accordingly control the communication connecting apparatus 200 to perform a converted typical function. As a variation, the user can select a mode of the apparatus 200 so that the apparatus 200 can switch between modes and thereby display default key images of the apparatus 200 or key images of the mobile terminal.

In another example, after displaying a key image of a first mobile terminal on the communication connecting apparatus, when a command to display a key image of a second mobile terminal is received from a controller of the second mobile terminal by the communication connecting apparatus, the key image of the second mobile terminal may also be displayed on the communication connecting apparatus. The case of receiving the command signal from the controller of the second mobile terminal, for example, may be a specific situation where a call, a message or an e-mail is received from a specific connected mobile terminal, or a case of being performed by a user's input. Here, the specific situation may be preset in an internal memory of the communication connecting apparatus 200 or the connected mobile terminal 100, or may be preset by a user's input.

Figure 8:
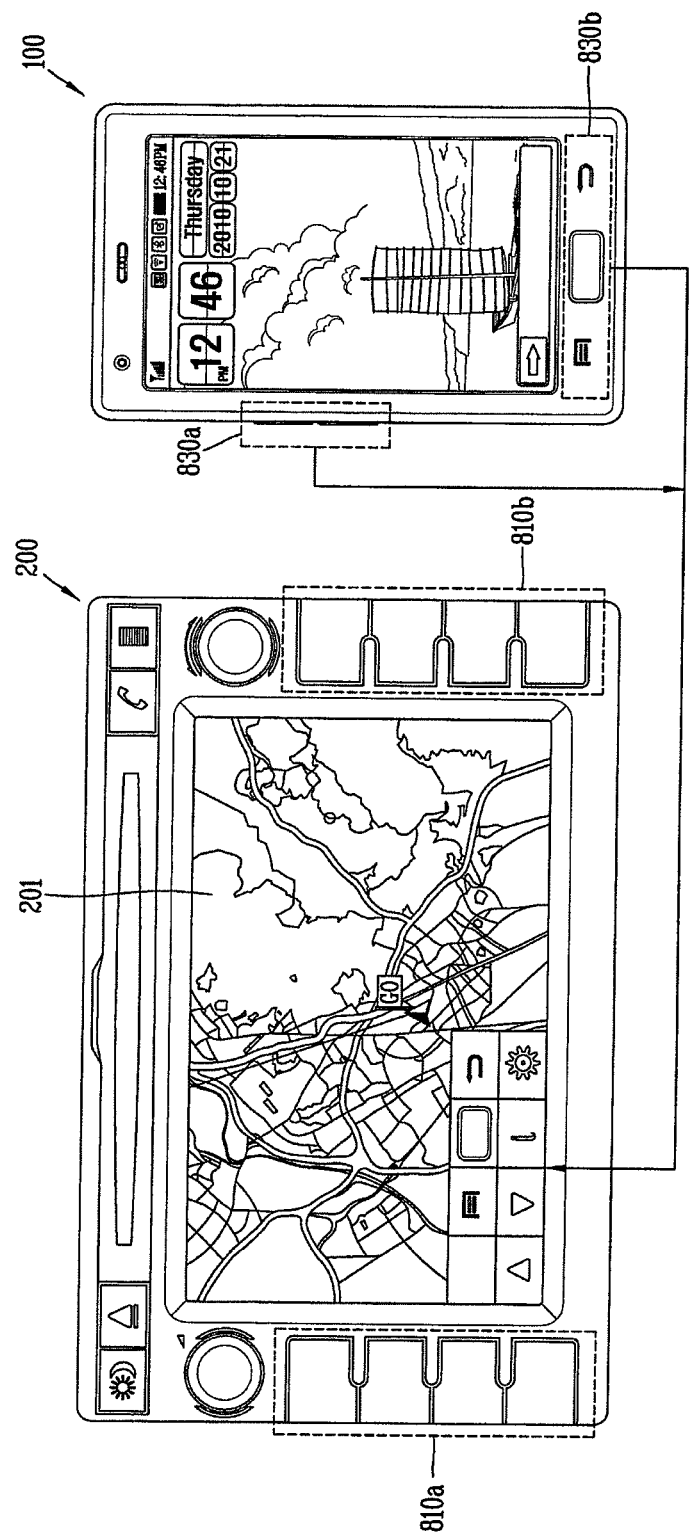
FIG. 8 is an exemplary view illustrating that hard keys disposed on the mobile terminal are displayed on the communication connecting apparatus in form of a touchpad according to an embodiment of the present invention.

In another example, key images of hard keys of a mobile terminal may be displayed on a display unit of a communication connecting apparatus in form of a touchpad, which is illustrated in FIG. 8 as an example. As illustrated in FIG. 8, key images of hard keys 830a and 830b disposed on the mobile terminal 100 connected to the communication connecting apparatus 200 may be displayed on a specific region of the display unit 201 of the communication connecting apparatus 200 as a menu bar 810c. For instance, the hard keys 830a and 830b of the connected mobile terminal 100 may be implemented in a touchpad arrangement on the display unit 201 of the communication connecting apparatus 200 so that the user can touch a menu/item of the displayed menu bar 810c to initiate a function corresponding to the selected menu/item in at least one of the mobile terminal 100 and the apparatus 200. Here, the hard keys 830a and 830b of the mobile terminal 100 may be implemented only in the touchpad arrangement on the display unit 201 of the communication connecting apparatus 200. Also, the hard keys 830a and 830b may be not only implemented as the touchpad on the display unit 201 but may additionally assigned to keys 810a and 810b of the communication connecting apparatus 200. Hence, when the two types are all implemented (i.e., when the keys 830a and 830b of the mobile terminal 100 are available both in the menu bar 810c and the keys 810a, 810b of the apparatus 200), more convenient interface can be provided according to a user selection.

Here, if a plurality of mobile terminals are connected to the apparatus 200, key images for each mobile terminal may be defined as one set to be displayed on the display unit 201 of the communication connecting apparatus 200. However, the present disclosure is not be limited to such structure. Any method, by which a plurality of hard keys disposed on each of a plurality of mobile terminals are displayed to be easily distinguishable for each mobile terminal, may also be applied.

In another example, when a specific key disposed on a mobile terminal 100 connected to the communication connecting apparatus 200 is set to carry out different functions according to a key input method, key images displayed on the display unit 201 of the apparatus 200 may be implemented to include the corresponding functions. For example, it is assumed that a first function is carried out when a user applies a short touch input onto a specific key disposed on the mobile terminal and a second function is carried out when the user applies a long touch input onto the same specific key disposed on the mobile terminal. Then those functions may be equally implemented on the display unit 201 of the communication connecting apparatus 200. For instance, when different functions are carried out according to a key touch time, the same different functions may be carried out according to a time, for which pressure is continuously applied to a key image. Here, the pressure applied time may be measured by the LCD controller 214 or the controller 212 illustrated in FIG. 3.

In another example, when a specific key disposed on a mobile terminal 100 connected to the communication connecting apparatus 200 is configured to carry out different functions according to a key input method, then a color of a key image displayed on the display unit 201 may change. However, the present disclosure may not be limited to such structure. Any method capable of recognizing the change of an executed function as well as changing of a key image as it is and the like may be applied.

In another example, in addition to the assignment of hard keys of a mobile terminal, the assignment of application icons and the assignment of control keys detected from an execution result, the following interfaces may be provided on keys or areas of the communication connecting apparatus for the user's convenience. As one example, an execution cancellation (e.g., "Back") button for returning the current execution screen to the previous execution screen from the mobile terminal may be displayed on a key of the communication connecting apparatus. As another example, a mobile terminal search (e.g., "Search") button for showing a list of connected mobile terminals may be displayed on a key of the communication connecting apparatus. As another example, a Text to Speech (TTS) button, for extracting text from an image displayed on the display unit of the communication connecting apparatus, converting the text into audio and outputting the audio, may be displayed on a key of the communication connecting apparatus. Besides, keys having functions, by which a user can control the connected mobile terminal and acquire data received from the connected mobile terminal conveniently and safely, may be displayed on keys of the communication connecting apparatus according to the embodiments of the present invention.

Figure 9:
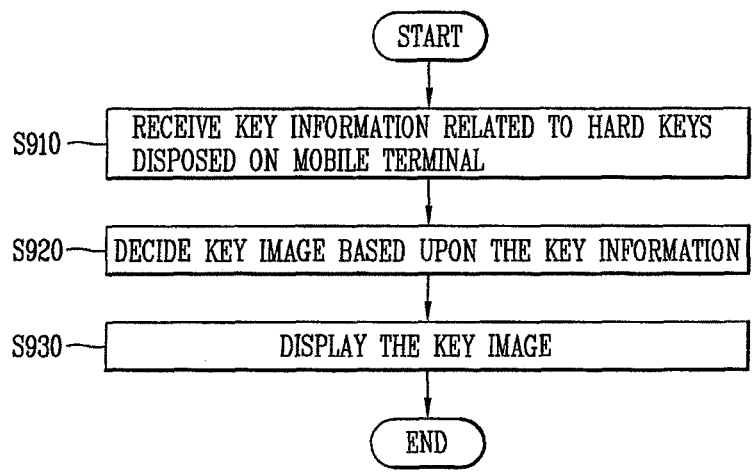
FIG. 9 is a flowchart illustrating operations of a communication connecting apparatus and method in accordance with an embodiment of the present invention.

FIG. 9 is a flowchart illustrating operations of a communication connecting apparatus in accordance with one exemplary embodiment of the present invention. A process in FIG. 9 is initiated when a communication connecting apparatus and a mobile terminal are connected to each other and are allowed to communicate with each other. The process of FIG. 9 can be implemented by the communication connecting apparatus (e.g., apparatus 200) discussed above according to various embodiments. Further, when the communication connecting apparatus connects with the mobile terminal, the process of FIG. 9 may be performed.

Referring to FIG. 9, at step 910, the communication connecting apparatus receives key information relating to keys disposed on the mobile terminal connected to the communication connecting apparatus, e.g., when the terminal is connected to the apparatus. Here, the keys disposed on the mobile terminal can be preferably hard keys, but can be soft keys, menu keys, icons, etc. The reception of the key information by the communication connecting apparatus may be achieved by receiving default images of the keys from the mobile terminal, requesting for an image reception or fetching key information relating to the mobile terminal previously stored in a specific memory. The key information, as aforesaid, may include images, positions, functions and the like relating to the keys of the mobile terminal connected to the communication connecting apparatus.

At step 920, the communication connecting apparatus decides key images to be displayed on a plurality of keys of the communication connecting apparatus based upon the acquired key information. Here, each of the plurality of keys of the communication connecting apparatus may include, for example, an individual small LCD screen thereon. The plurality of keys of the apparatus may alternatively be configured to have one large LCD screen, which is present at an entire upper surface of the plurality of keys and partitioned into smalls screens as many as the number of keys. In any case, an image displayed on the LCD screen of the apparatus may freely change. Upon deciding the key images, the communication connecting apparatus displays the decided key images on the keys of the communication connecting apparatus, at step 930. When a user applies a touch input onto one of the key images displayed on the apparatus, an object corresponding to the touched key image is selected and a corresponding function is carried out in at least one of the mobile terminal and the communication connecting apparatus.

In one variation, the method according to the embodiments of the present invention may include displaying the decided key images to be distinguishable for each mobile terminal when a plurality of mobile terminals are connected to the communication connecting apparatus at a given time.

In another example, the method may further include receiving icon information relating to an application installed in the mobile terminal, deciding at least one icon image corresponding to the application, and displaying the decided icon image on the communication connecting apparatus.

In another example, the method may further include detecting at least one control key from an execution result of an application received from the mobile terminal and deciding at least one key image corresponding to the detected control key.

In another example, the method may further include displaying a key of the communication connecting apparatus such that a general or default function (or previous function) of the key is carried out, when the mobile terminal which was connected to the communication connecting apparatus is disconnected from the communication connecting apparatus.

In another example, the method may further include displaying the decided key images on a screen of the communication connecting apparatus in form of a touchpad.

As described above, hard keys and/or soft keys which are different for each mobile terminal can be displayed on the communication connecting apparatus connected to the mobile terminal via a wired/wireless communication, such that the hard keys and/or soft keys disposed on each of the mobile terminals can be intuitively selected and controlled in the connected communication connecting apparatus.

Whenever different mobile terminals become connected to the communication connecting apparatus at a given time, corresponding key images displayed on the communication connecting apparatus may be displayed by changing the key images themselves accordingly and an arrangement thereof, such that key resources limited in the communication connecting apparatus can be efficiently used.

When the mobile terminal which was connected to the communication connecting apparatus becomes disconnected from the communication connecting apparatus, the keys of the communication connecting apparatus can automatically immediately be converted into a previous mode, a default mode, or a general mode, which thereby can improve the user's convenience and minimize or prevent the provisioning of unnecessary interfaces.

Meanwhile, the operation method for a communication connecting apparatus in accordance with embodiments of the present invention may be implemented as processor-readable codes in a recording medium, which a processor provided in the communication connecting apparatus 200 is readable. The processor-readable medium may include all types of recording devices each storing data readable by a processor. Examples of such processor-readable media may include ROM, RAM, CD-ROM, magnetic tape, floppy disk, optical data storage element and the like. Also, the processor-readable medium may also be implemented as a format of carrier wave, such as a transmission via an Internet. The processor-readable medium may be existent by being distributed in a computer system connected via a network and store and execute the processor-readable codes in the distribution manner.

Although the embodiments illustrate the communication connecting apparatus 200 as being located within a vehicle, but the present invention is not limited thereto and encompasses the structure of the communication connecting apparatus not being present in the vehicle. As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus configured to communicate with a mobile terminal and disposed in a vehicle, the mobile terminal including a mobile terminal key configured to execute different functions according to key input methods, the apparatus comprising:
    a communication unit configured to receive key information relating to the mobile terminal key from the mobile terminal when the apparatus is coupled with the mobile terminal, wherein the key information includes information of the key input methods and the different functions of the mobile terminal key;
    a vehicle interface corresponding to a speed sensor for sensing a vehicle speed;
    a display unit;
    a hard key;
    a screen formed on the hard key and displaying an original image; and
    a controller configured to
        generate a key image corresponding to a first function among the different functions of the mobile terminal key,
        display, on the screen, the generated key image thereon when a first input based on a first key input method among the key input methods is applied to the screen to execute the first function among the different functions,
        change the generated key image to another key image of the mobile terminal key corresponding to another function among the different functions of the mobile terminal key when a second input based on a second key input method among the key input methods is applied to the screen to execute a second function among the different function; and
        change the generated key image or the another key image to the original image for performing a preset original function, when an emergency situation of the vehicle relating to a sudden change in the vehicle's driving speed or a precipitate stop is detected.

2. The apparatus of claim 1, wherein upon a user's selection of the hard key, an operation corresponding to the selected hard key is performed at the apparatus, at the mobile terminal, or at both the apparatus and the mobile terminal.

3. The apparatus of claim 1, wherein the key information includes icon information relating to an application installed in the mobile terminal.

4. The apparatus of claim 1, wherein, when the apparatus is disconnected from the mobile terminal, the controller changes the displayed key image to a default image.

5. The apparatus of claim 1, wherein the apparatus is configured to be installed in a vehicle.

6. The apparatus of claim 1, wherein the key information includes a key image and a key function associated with the mobile terminal key.

7. A method of controlling an apparatus disposed in a vehicle, the apparatus having a display unit, a hard key and a screen formed on the hard key displaying an original image, and a vehicle interface corresponding to a speed sensor for sensing a vehicle speed, and communicating with a mobile terminal, the mobile terminal including a mobile terminal key configured to execute different functions according to key input methods, the method comprising:
    when the apparatus is coupled with the mobile terminal, receiving, by the apparatus, key information relating to the mobile terminal key from the mobile terminal, wherein the key information includes information of key input methods and different functions of the mobile terminal key;
    generating a key image corresponding to a first function among the different functions of the mobile terminal key,
    displaying, on the screen, the generated key image thereon when a first input based on a first key input method among the key input methods is applied to the screen to execute the first function among the different functions; and
    changing the generated key image to another key image of the mobile terminal key corresponding to another function among the different functions of the mobile terminal key when a second input based on a second key input method among the key input methods is applied to the screen to execute a second function among the different function; and
    changing the generated key image or the another key image to the original image for performing a preset original function, when an emergency situation of the vehicle relating to a sudden change in the vehicle's driving speed or a precipitate stop is detected.

* * * * *